May 12, 1959     J. E. GROSS     2,886,775
VARIABLE TIME-INTERVAL GENERATOR
Filed April 22, 1958     9 Sheets-Sheet 1

INVENTOR:
Julian E. Gross
BY
Attorney

INVENTOR:
Julian E. Gross
BY
Roland A. Anderson
Attorney

May 12, 1959 J. E. GROSS 2,886,775
VARIABLE TIME-INTERVAL GENERATOR
Filed April 22, 1958 9 Sheets-Sheet 5

INVENTOR:
Julian E. Gross
BY
Attorney

INVENTOR:
Julian E. Gross
BY
Roland A. Anderson
Attorney

May 12, 1959          J. E. GROSS          2,886,775
VARIABLE TIME-INTERVAL GENERATOR
Filed April 22, 1958          9 Sheets-Sheet 9

INVENTOR:
Julian E. Gross
BY
Attorney

United States Patent Office 2,886,775
Patented May 12, 1959

2,886,775

VARIABLE TIME-INTERVAL GENERATOR

Julian E. Gross, Albuquerque, N. Mex., assignor, by mesne assignments, to the United States of America as represented by the United States Atomic Energy Commission Application April 22, 1958, Serial No. 730,238

4 Claims. (Cl. 324—68)

This invention relates to a pulse generator and more particularly to a time interval generator wherein the time interval between pulses is precise.

In the field of precision timing and precise time measurements, it is desirable to maintain a reliable reference for calibration of test equipment. In this area, there are various types of time-measuring instruments for measuring time-delay circuits, the occurrence of events, the accuracy of a time delay line, and the like. The present invention generates pulses with such precise time intervals that they can be used for reference in calibrating time-measuring instruments. Also, the time interval generator with associated equipment can be employed to measure precisely the time interval of an unknown time event.

The generator to be described is digital in nature in that it involves no smoothly varying quantity which marks a time interval by amplitude coincidence with a fixed reference. Rather, a system of gates and logic circuits chooses appropriate pulses to define the time interval. Such systems usually have the disadvantage of allowing only discrete intervals to be generated. The present invention avoids this by providing a continously variable pulse period. For purposes of description, the generator provides time intervals from 25 to 140 microseconds, and with simple modifications the range can be extended down to 2.5 or up to 1000 microseconds without loss of precision. As with most digital devices, precision is largely independent of time setting.

A time interval, however precise, is unusable to other electronic equipment unless adequately defined. The instrument of this invention produces two identical pulses having a rise time of 20 millimicroseconds and a pulse width of 200 millimicroseconds. Adequate drive for most electronic circuits is assured by providing 100-volt positive pulses. A rise rate of 5 volts per millimicrosecond is easily sufficient to define a time interval to one millimicrosecond. Time is measured from a particular point on the first waveform to the corresponding point on the second. Proper waveshape for each pulse is maintained in transmission to other equipment by specifying a matched 180-ohm system.

Setting of the time interval is convenient because the interval for which the instrument is set is displayed as a six digit decimal number in an electronic counter. A new measurement of the interval is made approximately every second. The readout is directly in microseconds to three decimal places with an uncertainty of plus or minus one count in the last place. Readout uncertainty is therefore plus or minus one millimicrosecond. A combination of readout granularity, pulse to pulse jitter, and short time drift, brings the overall uncertainty in actual time interval to plus or minus three millimicroseconds. The stability of the time interval depends upon a variable frequency oscillator (VFO). Accuracy depends upon a crystal control oscillator since the time interval readout is accomplished by measuring the period of the VFO as a fraction of the crystal period. The only adjustment necessary for calibration is in the crystal oscillator circuit which is checked directly against WWV, or a laboratory standard. The display counter eliminates interpolation or calibrating of dials.

Most methods of measuring time intervals employ a means of generating a series of accurately spaced time marks which can be initiated by a phenomena which occurs more or less at random. In these systems, the time marks are displayed on an oscilloscope and the time interval must occur within the sweep frequency of the oscilloscope. The time interval to be measured initiates the time marks and the end of the time interval falls on or near one of the time marks. This means that if the second pulse ending the time interval falls between any two time marks, the time interval is a calibrated approximation. It can be seen that this method cannot be employed if the time interval is greater than the sweep frequency of the oscilloscope. Another method of measuring time interval is employed in radar where a transmitted pulse initiates the time interval which is displayed on an oscilloscope, and the reflected pulse is also displayed on an oscilloscope. These transmitted and received pulses can be employed to initiate a variable delay range indicator circuit that can be adjusted to equal the time interval between the transmitted and received pulse. This time interval is then read out on a calibrated dial. Here, the the accuracy is dependent upon the close calibration of the dial.

A further method of measuring time intervals employs a known frequency and a means of counting the pulses generated by the frequency during the time interval. But this system has no means of determining that an error does not exist in the count. This method can be made fairly accurate by employing a reliable reference for calibrating the pulse frequency.

By employing the precision time interval generator of the present invention as a reference against the measured time interval of the last described method, an indication of the error in that method can be noted. Further, the continuously variable generator described herein may also be used as a precision test instrument by equating its time delay with an unknown, using an additional instrument such as a high-speed oscilloscope for detecting time coincidence. This, of course, relieves the oscilloscope of any stringent requirements for linearity or calibration accuracy.

It is, therefore, an object of this invention to provide an instrument that will generate pulses having a precise time interval between pulses.

A further object of this invention is to provide an instrument that will generate pulses with means for varying the time interval between pulses and have extreme accuracy in the adjusted time interval.

Another object of this invention is to provide a time interval generator which, when calibrated against WWV, can be used as a laboratory instrument for calibrating time-measuring instruments.

A further object of this invention is to provide a means for accurately measuring the time interval of an event that occurs only once.

A still further object of this invention is to provide an instrument for measuring an unknown time interval wherein the comparison of the pulses representing the unknown time interval and those of the time interval generator on an oscilloscope imposes no stringent requirements for linearity or calibration accuracy.

A further object of this invention is to provide a means of automatically displaying on a display counter the time interval of the time interval generator.

Another object of this invention is to provide a means of continuously displaying the generated time interval as a digital number.

A variable time interval generator constructed in accordance with the present invention comprises two oscillators with one having a variable frequency output and the other a fixed frequency output. A frequency divider is connected to the variable oscillator for dividing its frequency by a selected factor. A counter is used for counting the periods of the fixed oscillator occurring during a cycle of the divided frequency of the variable oscillator. This defines the period of the variable oscillator in terms of that of the fixed oscillator. A circuit is provided for selecting as a time interval a predetermined number of periods of the variable oscillator. A trigger circuit instigates the occurrence of a first pulse at the start of the time interval and also instigates a second pulse marking the end of the time interval.

The novel features that are considered characteristic of this invention are set forth with particularity in the appended claims. The invention in itself, however, both as to its organization and method of operation as well as additional objects and advantages thereof, will be best understood from the following description when read in connection with the drawings.

Figure 1:
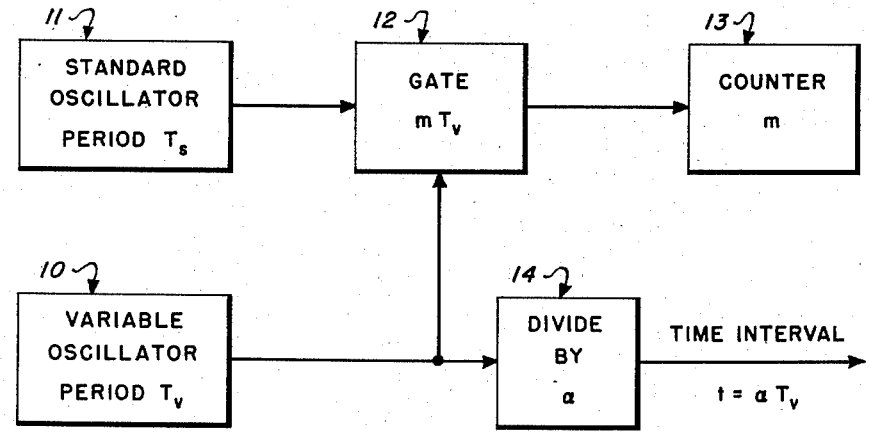
Fig. 1 is a block diagram illustrating in the broad sense the theory of operation of the variable time interval generator embodied in this invention.

It may be helpful in understanding the theory of operation of the variable time interval generator of the present invention by referring to Fig. 1. An oscillator 10 which is continuously variable has a period $T_v$ while a standard oscillator 11 has a period $T_s$. A gate 12 is opened for a time $mT_v$, a constant multiple of the period of variable oscillator 10. Pulses from standard oscillator 11 with a period $T_s$ are gated by gate 12 into counter 13. The number of pulses N depends upon the relation $$N = \frac{T_v}{T_s} m \quad (1)$$

The frequency of variable oscillator 10 is divided by a factor $\alpha$ in divider 14 which therefore has an output period $\alpha T_v$. One of these periods is selected as the time interval $t$ which gives the relation $$t = \alpha T_v \quad (2)$$

If the desired time unit is microseconds and we wish to read the counter to three decimal places, the counter will read a number $$n = 10^{-3} N \quad (3)$$

combining the above three equations $$n \frac{10^{-3}}{T_s} \frac{m}{\alpha} t \quad (4)$$

The standard oscillator frequency is set at 100 kilocycles so that $T_s = 10^{-5}$ sec. To get $n$ directly in microseconds, $$\left(\frac{m}{\alpha}\right)$$

must equal $10^4$ so that $$t = 10^{-6} n \quad (5)$$

It is to be distinctly understood that the frequency and the values used are a matter of choice and may be other than the frequencies and values stated above. For purposes of description, $m$ is $10^5$ and $\alpha$ is 10. The variable oscillator tunes over a range of 70 to 400 kilocycles giving a period $T_v$ of from 14.2857 to 2.5000 microseconds. From the second equation we see that the output time interval ranges from 25.000 to 142.857 microseconds. From the fifth equation it can be seen that the counter displays a number ranging from 25.000 to 142.857. The value of $\alpha$ is set at 10 to provide a convenient tuning range for the VFO and also to provide a band of frequencies over which pulse generation is not difficult. The significance of $\alpha$ is that logic must be provided such that when one pulse is chosen as the "start" pulse, another pulse "$\alpha$" periods later may be selected as the "stop" pulse.

Figure 2:
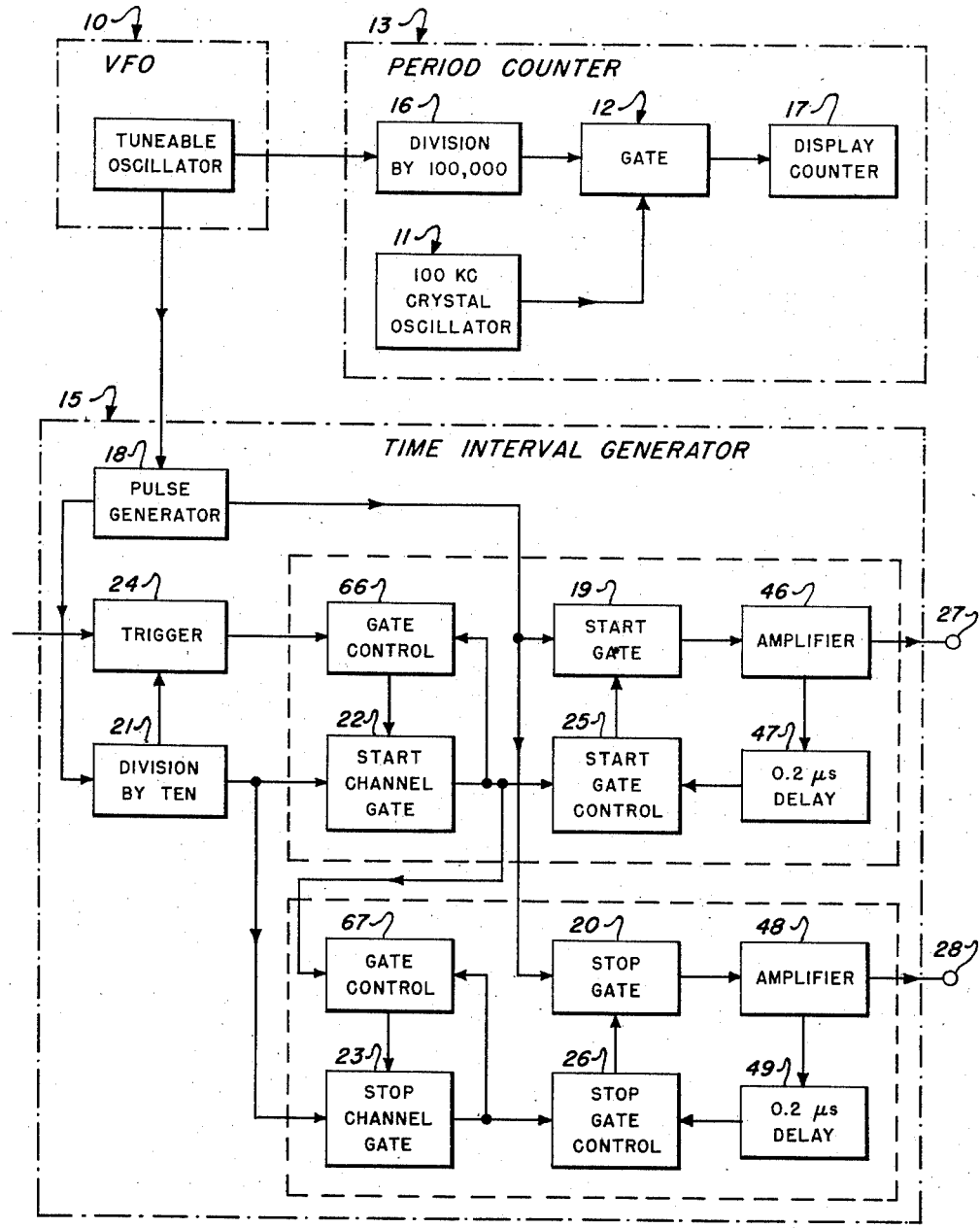
Fig. 2 is a block diagram illustrating more system details to include a variable frequency oscillator, a period counter, and time interval generator, that are embodied in this invention.

Referring to Fig. 2, there is shown a block diagram of the variable time interval generator and measuring system. The system has three major components referred to generically as variable frequency oscillator 10, period counter 13, and time interval generator 15. Tunable oscillator 10 covers, in four overlapping ranges, frequencies from 70 to 400 kilocycles per second. The signal from oscillator 10 is furnished to period counter 13. The period counter comprises 100 kilocycle standard crystal oscillator 11 calibrated against WWV together with divider 16, which divides the frequency of oscillator 10 by one hundred thousand. The output of the divided 16 operates gate 12 permitting pulses from oscillator 11 to pass to display counter 17. This display counter then counts the number of cycles of 100 kilocycle oscillator 11 which occur during a hundred thousand cycles of tunable oscillator 10. This oscillator may then be adjusted if necessary to provide the desired frequency with great accuracy.

Oscillator 10 furnishes its output also to pulse generator 18 in time interval generator 15. This pulse generator sharpens each output cycle of oscillator 10 and applies it simultaneously to start gate 19 and stop gate 20.

To select a defined time interval, frequency divider 21 divides a pulse frequency by ten and feeds the result to start channel gate 22 and stop channel gate 23. These gates may be triggered automatically or manually by trigger circuit 24. The output from start channel gate 22 is transmitted to start gate control 25 which controls start gate 19. Also, the output from stop channel gate 23 is transmitted to stop gate control 26, which controls stop gate 20, thus selecting an interval of ten periods of oscillator 10.

Operation of trigger circuit 24 controls gate controls 66 and 67. The first of the series of pulses from divide-by-ten circuit 21, occurring after trigger circuit 24 is operated, is channeled through start channel gate 22 and start gate control 25 to activate start gate 19, thus allowing an output pulse on terminal 27 through amplifier 46. The next pulse from divide-by-ten circuit 21 is channeled through stop channel gate 23 and stop gate control 26 to activate stop gate 20, thus permitting a pulse to be emitted from terminal 28 through amplifier 48. These pulses then accurately define a time interval corresponding to 10 periods of the output of pulse generator 18. If displayed on an oscilloscope, they would appear as positive sharp pulses of about 0.2 microsecond duration, with a rise time of .02 microsecond. The two pulses so displayed would have a time spacing of 10 times the period of pulses from pulse generator 18 regardless of the accuracy of the horizontal sweep of an oscilloscope.

It can now be seen that the start and stop pulses may be used to determine the accuracy of a time delay circuit. It may be arranged that the time delay shall start exactly simultaneously with the start pulse from start gate terminal 27 and the delay interval may be accurately determined by comparing its end with the stop pulse from stop gate terminal 28.

It can also be seen that the precisely defined time interval of this invention may be compared on an oscilloscope with an unknown time interval. Coincidence of the pulses defining the known and unknown time intervals may be achieved by adjustment of continuously variable frequency oscillator 10.

Variable frequency oscillator 10 is a conventional 2-terminal oscillator that provides a source of sine waves in the frequency range of 70 to 400 kilocycles. At any setting, the frequency stability over times of a half hour or more are kept to 10 parts per million. The readout system measures the average period of the VFO over $10^5$ cycles while the time interval generator 15 uses the span of only 10 cycles. A stability of 10 parts per million in the average will insure that the readout does not change by more than 1 or 2 units in the least significant figure (millimicroseconds), but instantaneous frequency during any $10^5$ periods must remain within 10 parts per million of the average in order that time interval generator 15 may use any 10 cycles. Amplitude modulation is held to less than .001 percent, since pulse generator 15 performs an amplitude selector. Cycle to cycle phase variation is kept very low for the same reason.

Period counter 13, like the VFO, uses conventional circuitry and therefore needs no further description than that described above.

For a better understanding of the operation of the time interval generator and in particular the manner in which the precise time interval between pulses is accomplished, each circuit therein will be described briefly.

Figure 3:
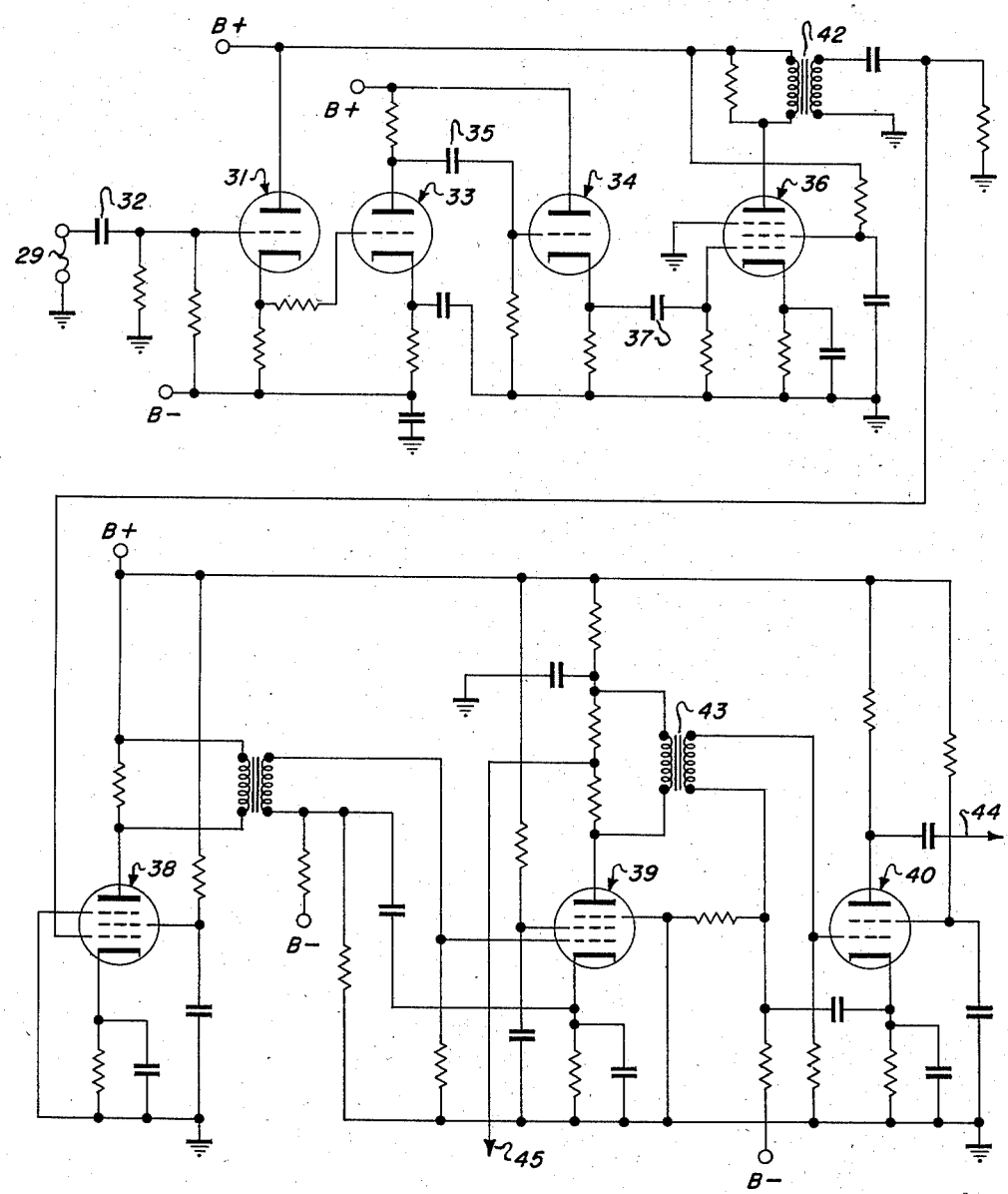
Fig. 3 is a circuit diagram of a pulse generator, a portion of the time interval generator shown in Fig. 2.

Starting with Fig. 3, there is shown a schematic of pulse generator 18.

Input terminals 29 are connected directly to tunable oscillator 10 shown in Fig. 2. The signal applied to input terminals 29 from oscillator 10 is sinusoidal and is applied to tube 31 through capacitor 32. Tube 31 is connected as a cathode follower with its output driving the control grid of tube 33 which is connected as a clipper amplifier. Tube 33 amplifies and inverts the negative-going half cycle of the sine wave. This clipped amplified sine wave is transmitted to the control grid of a second cathode follower 34 through coupling capacitor 35. Only the top half of the sine wave is passed by the cathode follower 34 because of the averaging effect of the capacitor coupling to its control grid. At the cathode of tube 34, pulses appear with an amplitude of approximately 150 volts having the shape of the top one-third of the sine wave. At this point in the circuit, any amplitude modulation or more than .001 percent would be intolerable. However, harmonic distortion is not only tolerable, but desirable, especially odd harmonic distortion. This tends to increase the rise rate near the peak of the waveform.

The output of cathode follower tube 34 is applied to the control grid of tube 36 through capacitor 37. Tubes 36 and 38 are both hard-driven class C stages with transformer coupling, while tubes 39 and 40 are over-driven amplifiers. In each of these stages, the rise time is decreased and the pulse width is narrowed. At the anode of tube 40, the pulse is approximately 40 volts in amplitude and about 0.2 microsecond in width, with a rise time of .01 microsecond.

The pulse generator circuit thus operates upon a sine wave of approximately 20 volts peak to peak to produce a 40-volt negative pulse with a rise time of approximately 10 millimicroseconds. Since the circuit operates synchronously, it is composed of basically class C amplifiers. However, the circuit must accommodate an input frequency range of 70 to 400 kc. delivering an output pulse that is substantially the same over the whole range.

The key stage in the pulse generator is tube 36, which, as stated before, is a hard-driven class C amplifier. The point on its input sine wave at which the stage begins to conduct determines the position of the output pulse, and variations in this voltage contribute practically all of the jitter encountered in the entire instrument. Since the rate of rise is multiplied by the gain of tube 36, the variation encountered in the amplifying of tube 38, which is essentially the same as tube 36, is negligible. An inverting transformer such as transformer 42 connected between amplifying stages 36 and 38 is required between each stage to allow the efficiency inherent in class C operation. Amplifying stages 39 and 40 develop very little self-bias because of the short time constant in their control-grid circuits. Such operation results in an overdriven amplifier, which amplifies the rate of rise, but does not decrease the pulse width as is ordinarily the case in class C operation.

Even though a repetition rate varies 5 to 1, the pulse output is substantially uniform. The total gain through the pulse generator is sufficiently high to multiply the rate of rise to more than 4 volts per millimicrosecond at the lowest frequency input of 70 kc. At high frequencies, the rate of rise is limited by coupling transformer 43 connected between tubes 39 and 40. Output pulses are taken from terminal 44 connected to the anode of tube 40 to be applied to the start gate circuits described later. Also, pulses are taken from the anode of amplifying tube 39 and in turn terminal 45 and are applied to the divide-by-ten circuit which also will be described in more detail later.

In Fig. 2, it can be seen that the ouput of pulse generator 18 is connected to both start gate 19 and stop gate 20. In a cycle of operation, one pulse from pulse generator 18 is passed by each of the gate circuits. The pulse marking the beginning of the time interval passes through start gate 19 and that marking the end through stop gate 20. The interval is marked by an arbitrary point on the leading edge of each pulse, so fall time and pulse duration are of secondary importance. Associated with start gate 19 is power amplifier 46, the 0.2 microsecond delay 47 and start gate control 25. Associated with stop gate 20 is power amplifier 48, 0.2 microsecond delay 49, and stop gate control 26. Stop gate 20 and its associated circuitry are identical to start gate 19 and its associated circuitry. Therefore, only the latter will be described in detail.

Figure 4:
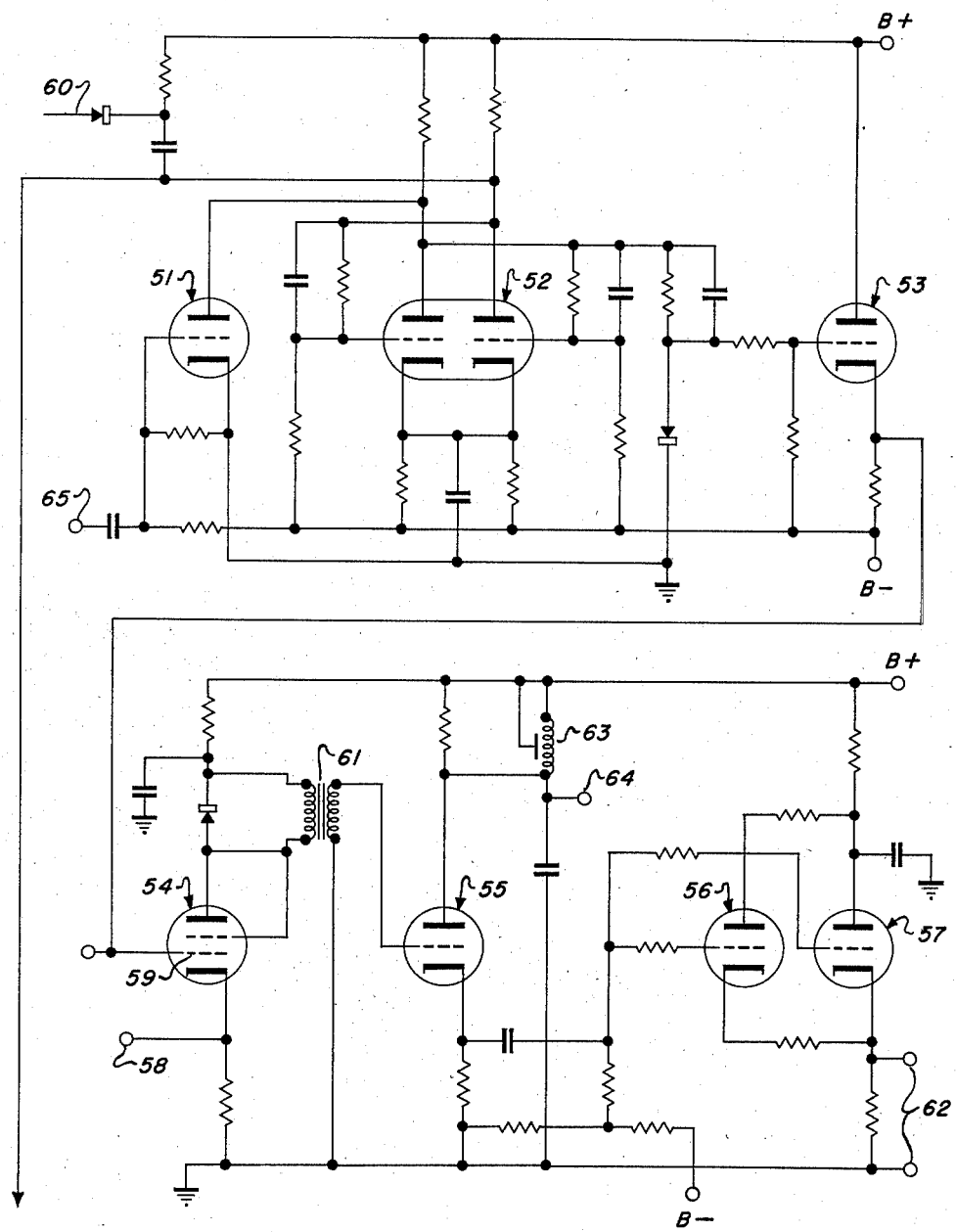
Fig. 4 is a circuit diagram of a start gate control, start gate, a 0.2 microsecond delay, and an amplifier, another portion of the time interval generator shown in Fig. 2.

In Fig. 4, the start gate control comprises tubes 51, 52 and 53. The gate comprises tube 54. The power amplifier comprises tubes 55, 56 and 57. The 0.2 microsecond delay is a part of tube 55. Negative pulses from pulse generator 18 of Fig. 2 are applied to terminal 58, which in turn is connected to the cathode of gate tube 54. Control of the gate is exercised in the grid circuit via cathode follower tube 53 which is driven by appropriate logic circuits and will be described below. Control grid 59 of gate tube 54 is held just below cutoff at −8 volts when the gate is closed. Gate tube 54 is therefore a grounded grid amplifier which is always biased to below cutoff. A 40-volt negative signal at the cathode will pass through the gate when it is open but will not cause conduction if the grid is at −48 volts. A grounded grid stage is a desirable gate for very fast pulses, because the grid forms a shield between input and ouput, thus reducing capacitive coupling. A gain of approximately two is realized in the gate tube itself. The pulse is inverted by pulse transformer 61 connected in the anode of gate tube 54, which has a two to one step-up ratio and which degrades the risetime to .02 microsecond, while maintaining the pulse width of 0.2 microsecond. In the end, a pulse is produced of approximately 100 volts into a fairly low impedance cable connected across terminals 62 of cathode follower tube 57. A very low driving impedance is required and this is accomplished by connecting tubes 56 and 57 in parallel with the signal applied simultaneously to their grids and their cathodes connected together to a common cathode impedance. Since tubes 56 and 57 are driven into the positive grid region, driving cathode follower tube 55 is necessary to supply grid current. Cathode follower tube 55 is driven by a pulse from gate tube 54 through pulse transformer 61. Also, tube 55 has a load in its anode consisting of a 0.1 microsecond delay line 63 which is short circuited at its terminal end. A negative pulse at the anode of tube 55 is reflected back after 0.2 microsecond as a positive pulse which is applied to terminal 64, which in turn is connected to an appropriate logic circuit input terminal 65 to turn the start gate off. This 0.2 microsecond delay is shown in block 47 of Fig. 2.

The output of start channel gate 22 (Fig. 2) is transmitted to start gate control 25 at terminal 60, which also serves indirectly to connect gate control 66 to start gate control 25. A further indirect connection between start gate control 25 and gate control 67 is furnished through a lead from the righthand anode of tube 52.

Since the time interval is continuously variable from 25 to 140 microseconds, the actual operation of the time interval generator depends also upon the provision of appropriate logic elements to select start and stop pulses in correct time sequence. Referring to Fig. 2, the logic circuits comprise gate control 66 with its associated start channel gate 22, gate control 67 with its associated stop channel gate 23, the divide-by-ten circuit 21, trigger generator 24, and pulse generator 18. The sequence of events in the logic circuits may be better understood by relating the curves shown in Fig. 5 with the block diagram of Fig. 2. Curve A represents the pulses from pulse generator 18 which are transmitted simultaneously to divide-by-ten circuit 21, start gate 19 and stop gate 20. Curve B represents the pulses from divide-by-ten circuit 21 which occur just after every tenth pulse of A. When trigger circuit 24 is actuated by a pulse represented by curve C at a random time with respect to curve B, a trigger pulse represented by curve D is emitted from trigger generator 24, which is terminated by a pulse B. Pulse D from trigger generator 24 activates gate control 66, which holds until the occurrence of the next B pulse from divide-by-ten circuit 21 producing a waveform represented by curve E. Gate control 66 and start channel gate 22 cooperated in producing pulse E which triggers start gate control 25, which gives rise to pulse F, which is represented by curve F. Pulse F is transmitted to start gate 19, which generates start pulse G through power amplifier 46 at terminal 27. This constitutes the start of the precise time interval of this invention.

Figure 5:
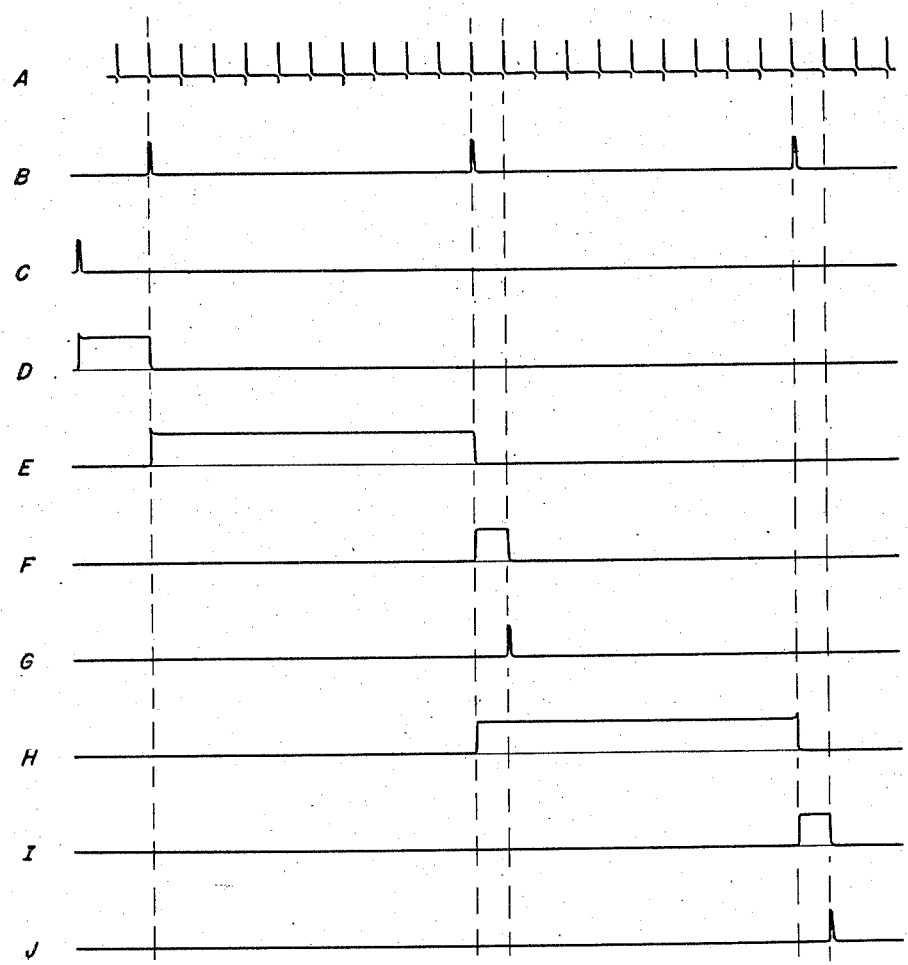
Fig. 5 is a graphic illustration of a sequence of events in logic circuits taken in connection with the block diagram of Fig. 2.

Start gate pulse E from start channel gate 22 is also transmitted to gate control 67. This E pulse activates gate control 67, which holds until the next B pulse from divide-by-ten circuit 21. Pulse B restores gate control 67 through stop channel gate 23 and produces a pulse I, represented by curve I, by activating stop gate control 26. Gate control 67 and stop channel gate 23 work in conjunction in a similar manner to gate control 66 and start channel 22 to produce a pulse H, represented by curve H, which triggers stop gate control 26, which produces pulse I. Pulse I is transmitted to stop gate 20, which generates stop pulse J through power amplifier 48 at terminal 28. This constitutes the end of the precise time interval. The stop gate control 26 holds until reset by a pulse generator 18 which is transmitted to stop gate 20. From this point on, stop gate 20, 0.2 microsecond delay 49, and power amplifier 48, operate in the same manner as described in Fig. 4 for start gate 19, the 0.2 microsecond delay 47, and power amplifier 46. The curves of Fig. 5 are independent of the time scale chosen. Of course, with variations in variable frequency oscillator 10 of Fig. 2, the actual rate of repetition pulses represented by curve A will change. But these changes in pulse rate will not alter the logic sequence.

Figure 6:
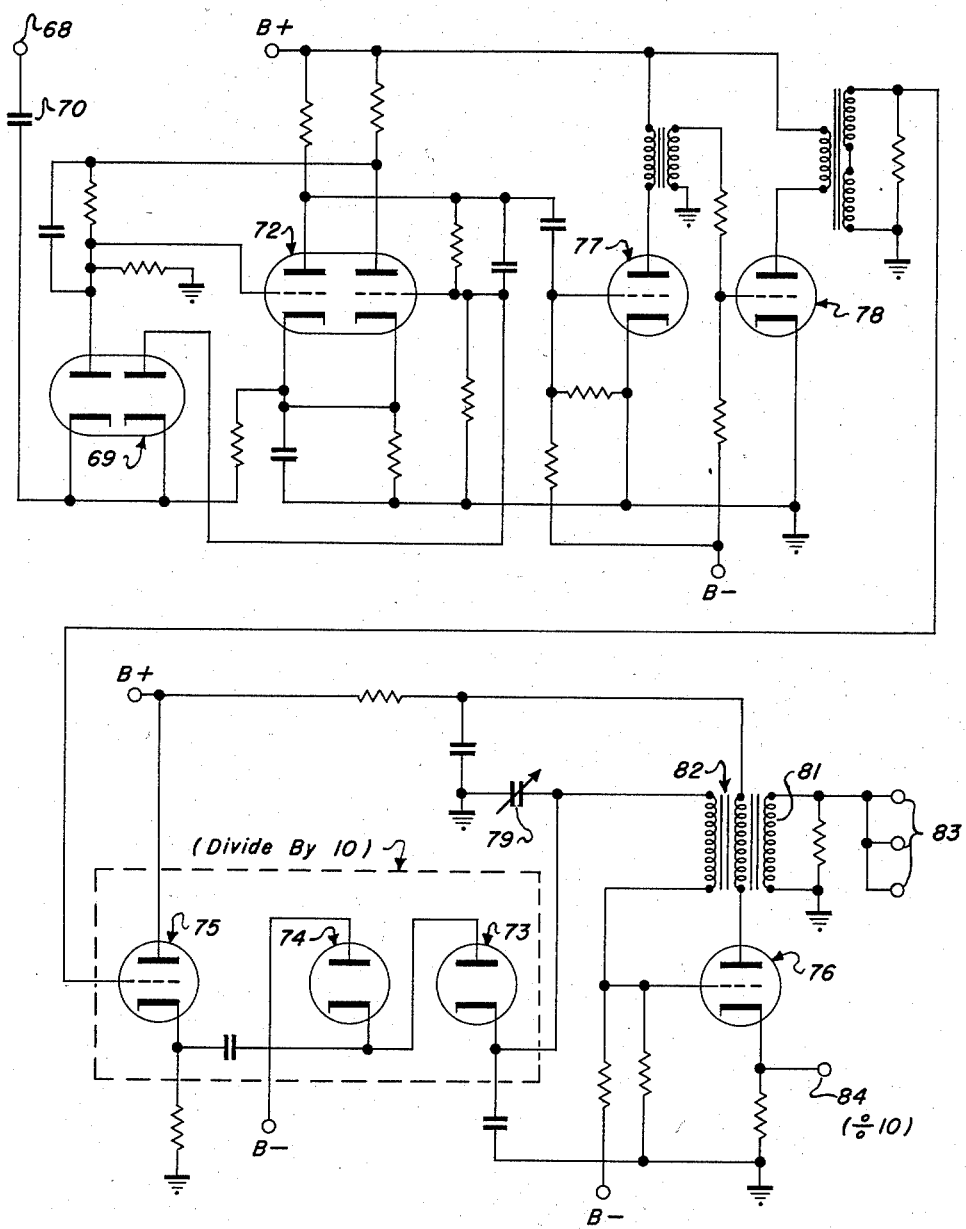
Fig. 6 is a schematic diagram of the divide-by-ten circuit which is a part of the logic circuitry and time interval generator shown in the block diagram of Fig. 2.

For a more detailed description of the divide-by-ten circuit 21 of Fig. 2, refer to Fig. 6, in which the pulses from pulse generator 18 of Fig. 2 are applied to terminal 68 and in turn to the cathodes of diodes 69 through capacitor 70. A binary stage comprising tube 72, triggered by the pulse generator through what might be called injection diode 69, is used to drive a count-of-five circuit which comprises diodes 73 and 74 and triodes 75 and 76. Two stages of shaping and amplification, which are accomplished by triodes 77 and 78, drive triode 75 connected as a cathode follower, with a constant amplitude pulse regardless of frequency. This is, of course, a requisite for the step diode counter. A division adjustment which is accomplished by variable capacitor 79 is provided to set the count ratio in the step diode counter. Tube 76, connected as a blocking oscillator, resets the step diode counter at count five and provides the divide-by-ten pulses to other parts of the circuit. These pulses are transmitted from winding 81 of pulse transformer 82 and in turn via terminal 83 to trigger generator 24, start channel gate 22, and stop channel gate 23, shown in Fig. 2. There is a time lag of only 0.2 microsecond between the input and output pulses.

Figure 7:
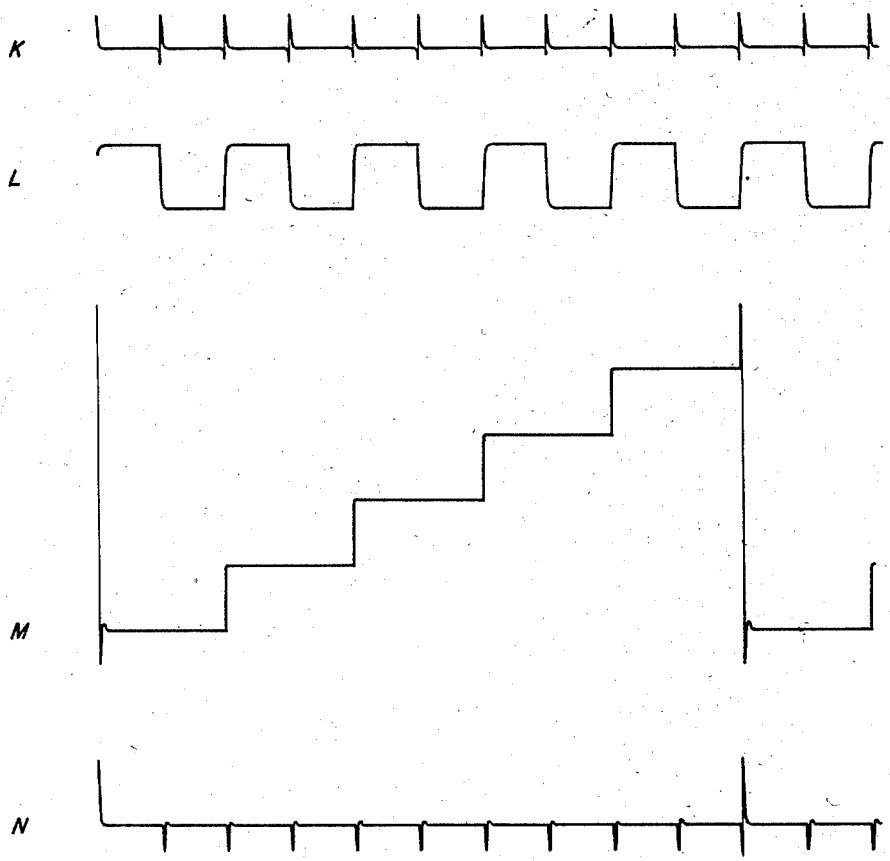
Fig. 7 is a graphic illustration of pulse shapes taken at points in the divide-by-ten circuit shown and described in Fig. 6.

Referring to Fig. 7 and the divide-by-ten circuit of Fig. 6, curve K represents the pulses as seen at the cathodes of diode 69, while curve L represents the pulses as seen from the lefthand anode of binary stage tube 72. In curve M we can see the divide-by-five or step diode counter as represented by diodes 73 and 74 and as seen at the cathode of diode 73. Curve N represents the pulses as seen from terminal 84 connected in the cathode circuit of triode 76 consisting of a positive pulse representing the desired fractional multiple of the output frequency of pulse generator 18, superimposed upon the negative generator output pulses.

Figure 8:
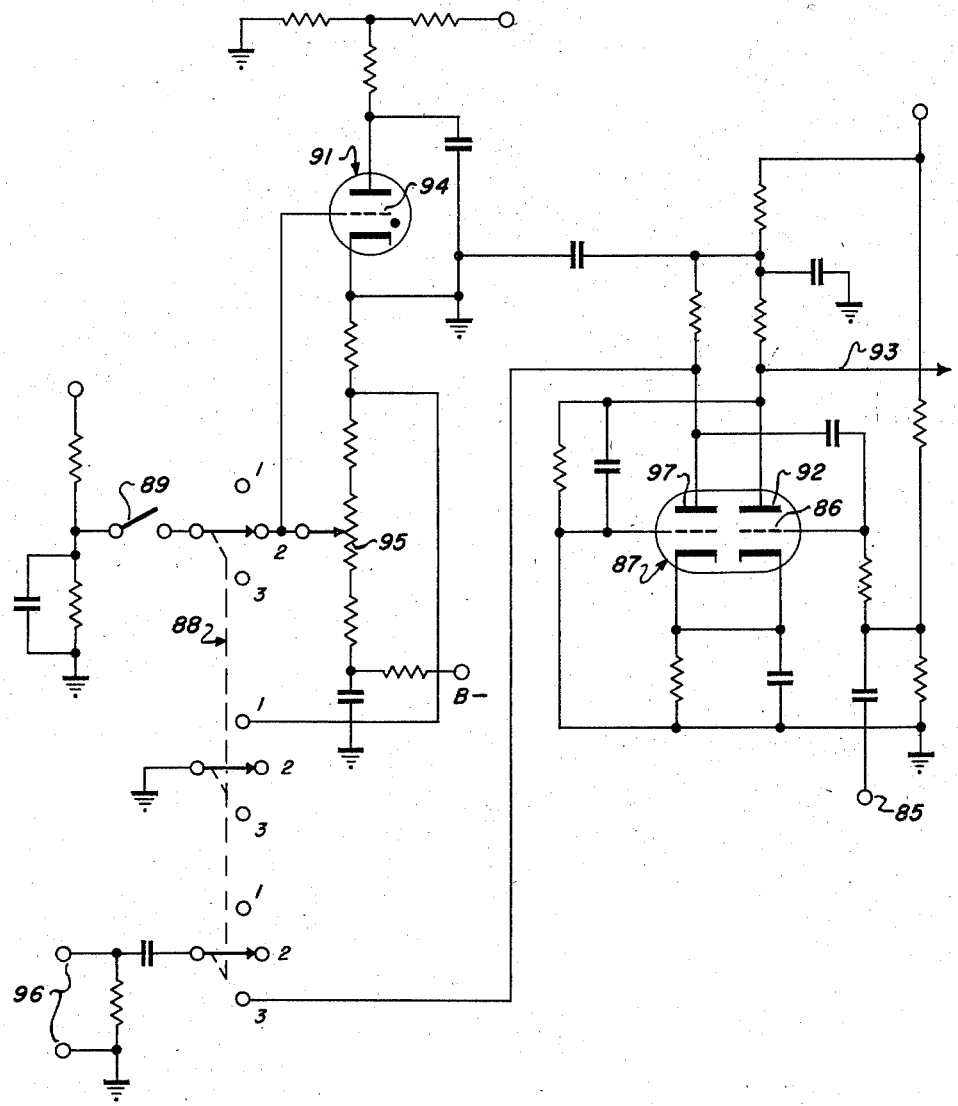
Fig. 8 is a circuit diagram of the trigger generator which is a part of the logic circuit and time interval generator shown in block diagram of Fig. 2.

Next in the logic circuits is trigger generator 24 of Fig. 2, which is shown schematically in Fig. 8. The trigger generator may be actuated by an external negative pulse, by a pushbutton or by an internal relaxation oscillator. A signal from the divide-by-ten circuit applied to terminal 85, which in turn is applied to the control grid 86 of tube 87 connected as a monostable multivibrator circuit, serves to synchronize the trigger generator so that its output comes just after a pulse. In operating the trigger circuit manually, multiple switch 88 is located in position two and manual switch 89 is closed, thus firing thyratron tube 91, which triggers monostable multivibrator tube 87. The long recharge time of the anode circuit of thyratron tube 91 prevents retriggering due to contact bounce in switch 89. The return of the monostable multivibrator circuit of tube 87 to its stable state is synchronized by a positive divide-by-ten pulse that is applied to terminal 85, which in turn is applied to control grid 86. This action provides a negative transition at anode 92 of tube 87 and in turn terminal 93, which may be regarded as the output from the trigger generator.

In the repetitive position, switch 88 is located in position one. This allows thyratron tube 91 to function as a relaxation oscillator. Its repetition rate is set by adjusting the bias on control grid 94, which is accomplished by variable resistor 95 connected to appropriate resistor dividing network and a negative bias. In the external position, switch 88 is located in position three and a negative pulse is applied to terminals 96, which in turn is applied to anode 97 of tube 87, which triggers the monostable multivibrator directly. A repetition rate up to approximately 100 cycles may be employed. The signal pulses applied to input terminals 96 must be negative, with an amplitude of from five to one hundred volts, and with rise time of less than 1.0 microsecond. It can be seen from Fig. 2 that the output of trigger generator 24 is connected directly to gate control 66.

The last of the logic circuits as shown in Fig. 2 are gate controls 66 and 67 and start and stop channel gates 22 and 23 respectively.

Figure 9:
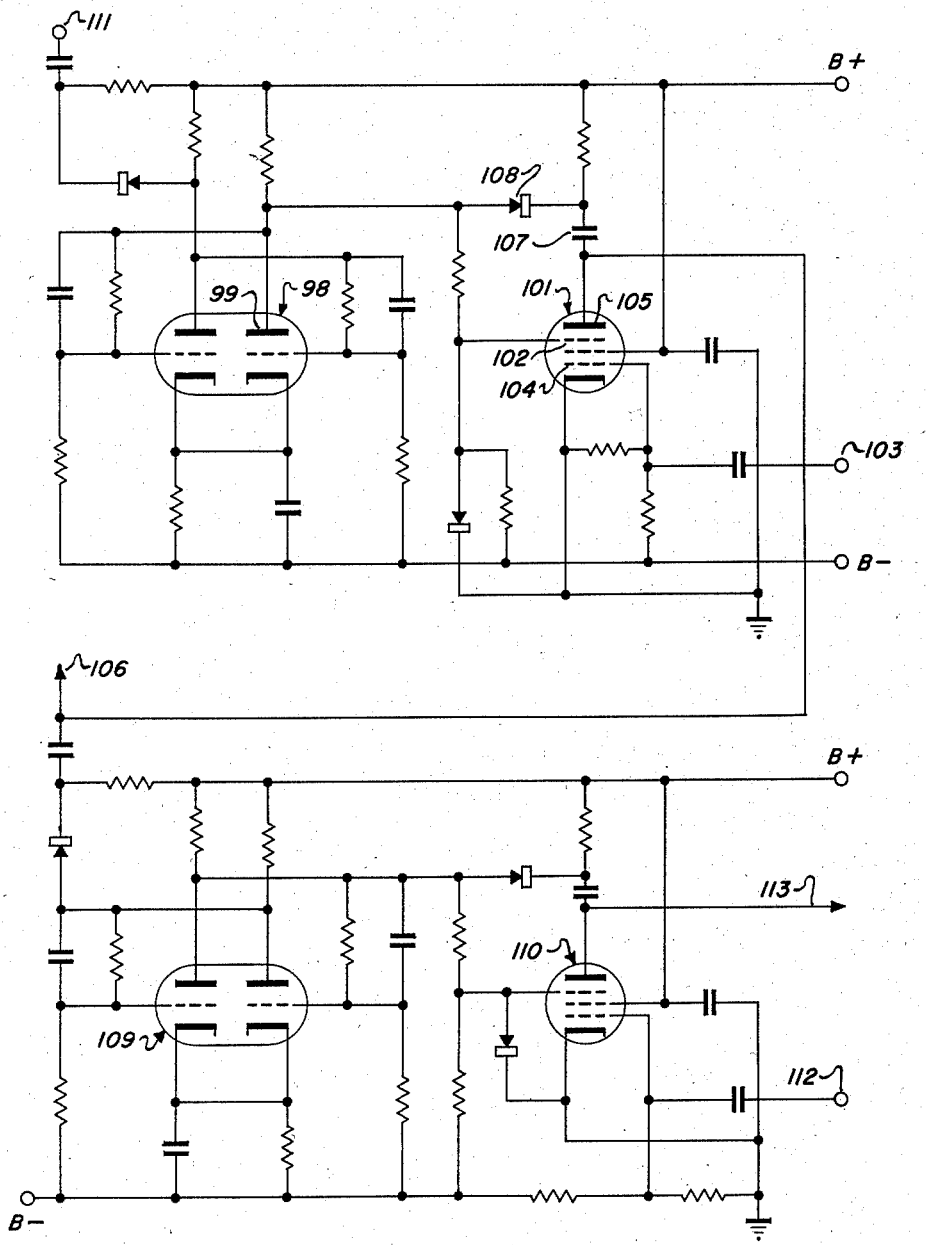
Fig. 9 is a circuit diagram of the start and stop gate controls which are a part of the logic circuits and the time interval generator shown in block diagram of Fig. 2.

Referring to Fig. 9, the output of trigger generator 24 of Fig. 2 triggers start channel gate tube 98. The circuit of tube 98 is connected as a bistable multivibrator which normally operates with anode 99 negative, thus holding start channel gate tube 101 circuit in closed condition. Tube 98 constitutes gate control 66, while tube 101 is start channel gate 22, shown in Fig. 2. When tube 98 is changed to its "on" state by the trigger generator, it brings suppressor grid 102 of tube 101 to zero bias. This occurs shortly after a divide-by-ten pulse. The next divide-by-ten pulse applied to terminal 103 and in turn to control grid 104 of tube 101 is passed through and appears as a negative pulse on anode 105, which in turn is transmitted from terminal 106. This pulse from terminal 106 has three functions; it is fed back to anode 99 of start channel gate control tube 98 through series connected capacitor 107 and diode 108, which causes the gate to close, it triggers start gate control 25 shown in Fig. 2, which initiates the start gate cycle, and it operates stop channel gate control shown by tubes 109 and 110. It should be noted that tubes 109 and 110 are connected in the same manner as tubes 98 and 101. Terminal 111 is connected to trigger circuit 24 of Fig. 2. Input terminal 112 is connected indirectly to output terminal 83 of the divide-by-ten circuit of Fig. 6, while output terminal 113 is connected indirectly to start gate control 26 shown in Fig. 2. The sequence of operation in the stop channel gate circuit is identical to that in the start channel. The two circuits therefore are identical. Note that each circuit is self-resetting, so that only one pulse is passed when the gate is closed. Sufficient delay is provided between the gate control signal and the gate tube that the pulse which opens the gate does not pass through. The gating technique used allows wide variation in the period of the input pulses.

What has been described is a precision time interval generator having the ability to measure time intervals with extreme accuracy and to operate as a laboratory standard for testing time interval measuring devices.

While a particular embodiment has been shown and described, it will, of course, be understood that various modifications may be made without departing from the invention. The appended claims are therefore intended to cover any such modifications as fall within the true spirit and scope of the invention.

What is claimed is:

1. A variable time-interval generator including an oscillator variable in output frequency, a standard oscillator of fixed frequency, means for dividing by a predetermined factor the frequency of said variable oscillator, counter means for counting the cycles of the fixed frequency occurring during a cycle of the divided frequency of said variable oscillator thereby defining the period of said variable oscillator in terms of that of said fixed oscillator, a pulse generator for deriving pulses at a repetition rate equal to the variable frequency, a divider circuit for selecting pulses at a predetermined submultiple of said pulse generator repetition rate, and trigger means for instigating a start and a stop pulse defining a time interval measured by the divided repetition rate.

2. A variable time-interval generator including an oscillator variable in output frequency, a standard oscillator of fixed frequency, means for dividing by a predetermined factor the frequency of said variable oscillator, counter means for counting the cycles of the fixed frequency occurring during a cycle of the divided frequency of said variable oscillator thereby defining the period of said variable oscillator in terms of that of said fixed oscillator, a pulse generator for deriving pulses at a repetition rate equal to the variable frequency, a divider circuit for selecting pulses at a predetermined submultiple of said pulse generator repetition rate, trigger means for instigating a start and a stop pulse defining a time interval measured by the divided repetition rate, and gating means successively synchronizing said start and stop pulses with said submultiple pulses occurring at said divided repetition rate.

3. A variable time-interval generator including an oscillator variable in output frequency, a standard oscillator of fixed frequency, means for dividing by a predetermined factor the frequency of said variable oscillator, counter means for counting the cycles of the fixed frequency occurring during a cycle of the divided frequency of said variable oscillator thereby defining the period of said variable oscillator in terms of that of said fixed oscillator, a pulse generator for deriving pulses at a repetition rate equal to the variable frequency, a divider circuit for selecting pulses at a predetermined submultiple of said pulse generator repetition rate, trigger means for instigating a start and a stop pulse defining a time interval measured by the divided repetition rate, gating means successively synchronizing said start and stop pulses with said submultiple pulses occurring at said divided repetition rate, and means for restoring said gating means to its synchronizing state in successive response to said start and stop pulses.

4. A variable time-interval generator including an oscillator variable in output frequency, a standard oscillator of fixed frequency, means for dividing by a predetermined factor the frequency of said variable oscillator, counter means for counting the cycles of the fixed frequency occurring during a cycle of the divided frequency of said variable oscillator thereby defining the period of said variable oscillator in terms of that of said fixed oscillator, a pulse generator for deriving pulses at a repetition rate equal to the variable frequency, a divider circuit for selecting pulses at a predetermined submultiple of said pulse generator repetition rate, trigger means for instigating a start and a stop pulse defining a time interval measured by the divided repetition rate, means for periodically actuating said trigger means at a predetermined rate, gating means successively synchronizing said start and stop pulses with said submultiple pulses occurring at said divided repetition rate, and means for restoring said gating means to its synchronizing state in successive response to said start and stop pulses.

References Cited in the file of this patent

UNITED STATES PATENTS

| | | |
|---|---|---|
| 2,700,133 | Pfleger | Jan. 18, 1955 |
| 2,831,162 | Gross | Apr. 15, 1958 |
| 2,832,044 | Bliss | Apr. 22, 1958 |